United States Patent

Kurth

[15] 3,676,598

[45] July 11, 1972

[54] FREQUENCY DIVISION MULTIPLEX SINGLE-SIDEBAND MODULATION SYSTEM

[72] Inventor: Carl Ferdinand Kurth, Andover, Mass.

[73] Assignee: Bell Telephone Laboratories, Incorporated, Murray Hill, Berkeley Heights, N.J.

[22] Filed: June 8, 1970

[21] Appl. No.: 44,030

[52] U.S. Cl. .......................................... 179/15 FD, 179/15 A

[51] Int. Cl. .......................................... H04j 1/02

[58] Field of Search ............179/15 A, 15 FD, 15 SS, 15 BY; 178/50

[56] References Cited

UNITED STATES PATENTS 3,095,539 6/1963 Bennett ...........................179/15 A X 3,358,083 12/1967 Helm .......................................178/50

3,432,619 3/1969 Blasbalg ...............................179/15 A 3,435,147 3/1969 Malm ...................................178/50 X

*Primary Examiner*—Ralph D. Blakeslee

*Attorney*—R. J. Guenther and William L. Keefauver

[57] ABSTRACT

A frequency division multiplex single-sideband modulation system uses a multiplexed digital filter, the passband of which is sequentially shifted from one multiplexed channel to another in synchronization with an input time division multiplex commutator and a frequency multiplexer modulator. In other embodiments of the invention selected spectral components are advantageously emphasized by signal processing techniques employing repetitive sampling prior to modulation and filtering.

19 Claims, 6 Drawing Figures

INVENTOR
C. F. KURTH
BY Gerard E. Murphy
ATTORNEY

FREQUENCY DIVISION MULTIPLEX SINGLE-SIDEBAND MODULATION SYSTEM

BACKGROUND OF THE INVENTION

1. Field of the Invention

This invention pertains to modulation systems and, more particularly, to frequency division multiplex single-sideband modulation systems using digital filters.

Fundamental to the practical communication of information via electric media is efficiency of transmission, whether measured in terms of bandwidth, power required, complexity of the circuitry or other applicable criteria. Efficiency of transmission necessitates that the information to be communicated to a distant point be processed before transmission over an intervening medium. In terms of modern communications, signal processing comprises modulation, in one form or another, of an information-bearing signal. Modulation not only makes transmission possible at frequencies higher than the frequencies of the information-bearing components of the applied signal, but also permits frequency multiplexing, i.e., staggering of signal frequency components over a specified frequency spectrum.

It is well known that the process designated as amplitude modulation is wasteful of the frequency spectrum, since transmitting both sidebands of a modulated signal requires double the bandwidth needed for only one sideband, and is wasteful of power, particularly since the transmitted carrier conveys no information. Thus, as the useful frequency spectrum has become congested, resort has been made to a form of modulation, i.e., single-sideband, where only one sideband, as the name implies, is transmitted. Of course, to maximize efficiency of transmission, the manner in which single-sideband modulated signals are generated and combined must be made as efficient and economical as is technologically possible. Particularly is this true in those large frequency multiplex systems where thousands, if not tens of thousands, of single-sideband multiplex terminals are utilized.

2. Description of the Prior Art

In a typical frequency division multiplex system, each of a plurality of applied baseband signals is processed by a preassigned channel modulation subsystem prior to combination with each of the other processed baseband signals to form a multiplexed signal group. A particular modulation subsystem is disclosed in the *Proceedings of the IRE*, at page 1703, Dec. 1956 by D. K. Weaver. Prior art multiplex systems have generally utilized analog filters. In recent years, the rapid development of integrated circuit technology and the potential for large scale integration of digital circuits has made digital filters much more attractive than their analog counterparts. The direct substitution, however, of digital filters for analog filters in a particular system creates problems not encountered in the corresponding analog system. For example, since digital filters operate upon quantized signal samples, the signal frequency components are selectively dispersed over the entire frequency band. Thus, foldover (aliasing) and interchannel interference is a recurring problem inherent in a digital system.

It is an object of this invention to convert, efficiently and accurately, a plurality of space division multiplex signals into a corresponding plurality of frequency division multiplex single-sideband signals using digital filtering techniques.

SUMMARY OF THE INVENTION

In accordance with the principles of this invention, this and other objects are accomplished by selectively combining, modulating, and filtering a plurality of space division multiplexed signals. More particularly, in one embodiment of this invention, a plurality of input signal channels are time division multiplexed, selectively modulated, in synchronization with the time multiplex operation, and then filtered by a synchronized multiplexed digital filter, the passband of which is sequentially shifted to select desired sideband spectral components. In other embodiments of the invention, a plurality of space division multiplexed signals are each sampled, coded into digital form, and the coded samples stored for a predetermined interval of time. Apparatus repetitively samples, i.e., commutates, the stored coded samples at an increased rate and applies them to a plurality of signal paths wherein they are modulated, filtered, modulated again, and then recombined to develop a frequency division multiplex single-sideband signal.

DETAILED DESCRIPTION

Figure 1:
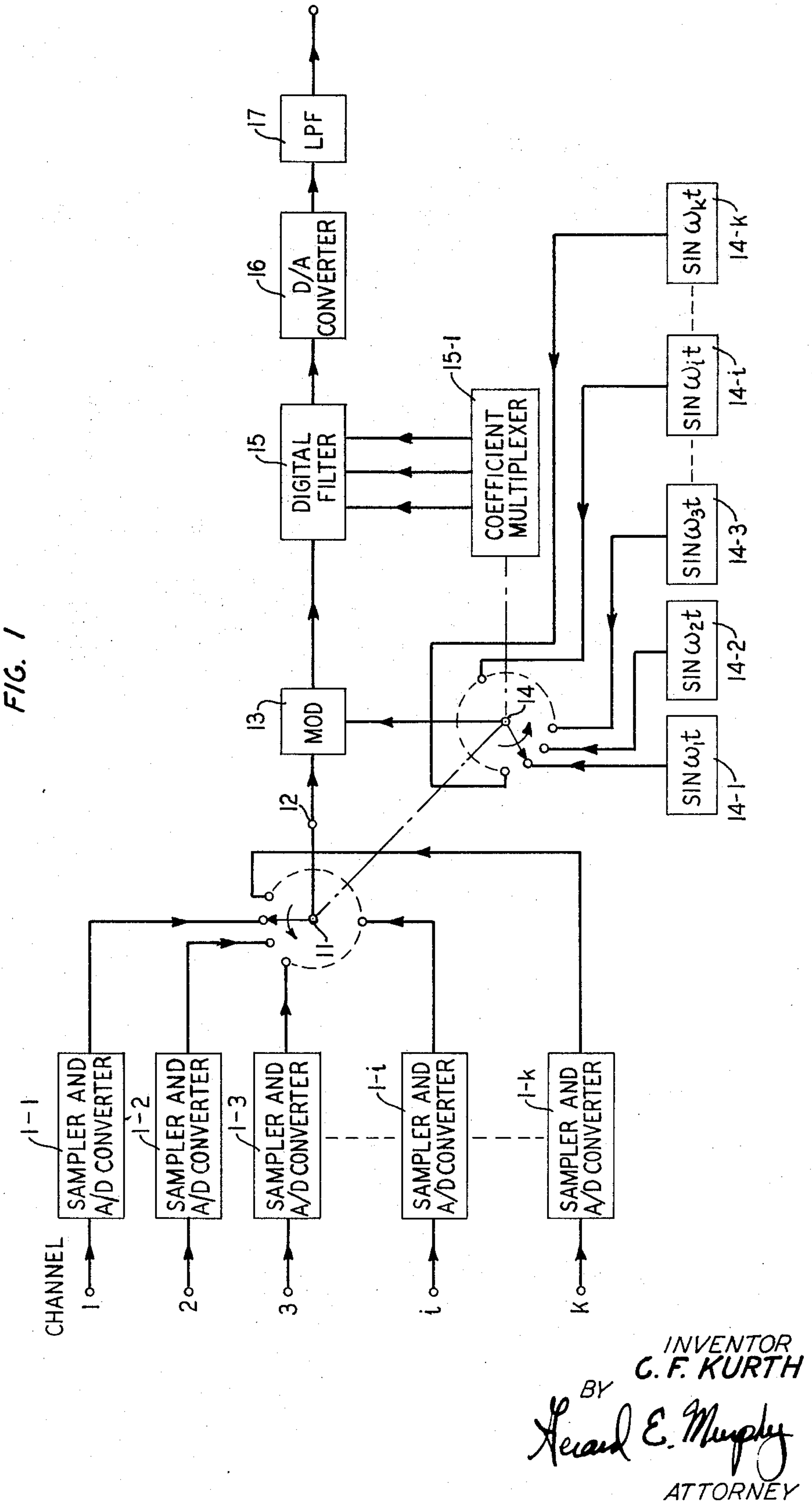
FIG. 1 is a block diagram of a frequency division multiplex single-sideband system in accordance with this invention.
Figure 2:
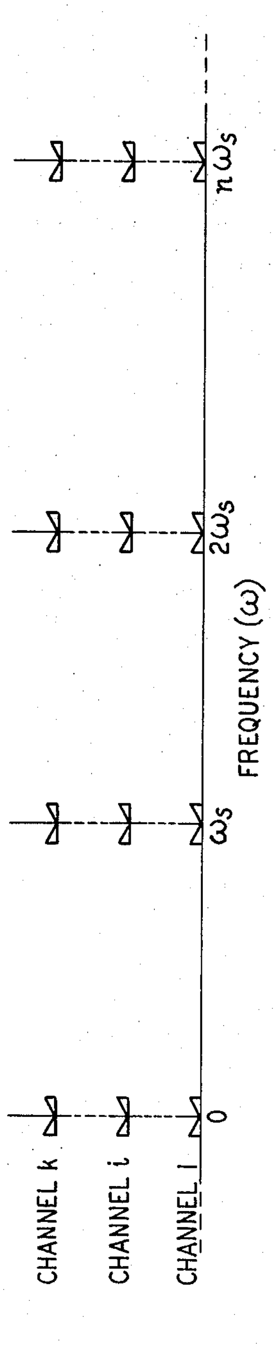
FIGS. 2 and 3 depict various signal spectral components present in the system of FIG. 1.

FIG. 1 illustrates a multiplex system, in accordance with this invention, wherein a plurality of input space division multiplexed signal channels, 1 through $k$, where $k$ is a predetermined number, are selectively combined to develop a corresponding plurality of frequency division multiplex single-sideband (FDM/SSB) signal channels. Each channel signal is sampled and converted to a digital signal by sampler and analog-to-digital (A/D) converter apparatus, 1-1 through 1-$k$, respectively. Such apparatus may be, of course, conventional. Commutator 11, or any electronic equivalent thereof, operating at an angular frequency corresponding to the sampling frequency used in each channel, selectively applies each channel signal to terminal 12 to develop a time division multiplex double-sideband (TDM/DSB), signal, the spectrum of which is shown in FIG. 2. The process of commutation may, of course, be considered a further sampling of the channel signals. In FIG. 2, the abscissa corresponds to frequency, $\omega$, and the ordinate corresponds to amplitude. In order to depict the separation in time of the various signal channels, channels 1 through $k$ are shown "stacked" one above the other. Thus, the ordinate also represents a time displacement. What appear to be "bow ties" are symbolic representations of a double-sideband signal. This type of presentation is believed highly illustrative and will be consistently used in succeeding figures of the drawings.

All $k$ time division multiplexed channels are eventually processed by digital filter 15. Consistent with the Nyquist sampling theorem, or stated another way, to avoid signal degradation due to foldover, the sampling frequency, $\omega s$, within filter 15, must be higher than the highest signal frequency of the output FDM/SSB signal. Since digital filter 15 is multiplexed for all $k$ signal channels, all signal channels must be respectively sampled at the same rate, $\omega s$, by apparatus 1-1 through 1-$k$. Thus, as shown in FIG. 2, replicas of the double-sideband baseband signal spectrum, for each channel, appear at integer multiples of the sampling frequency, $1\omega_s, 2\omega_s, \ldots n\omega_s$.

It is well known that a high-pass digital filter operating at a sampling frequency of $\omega_s$ has stopbands, symmetrically centered about multiples of $\omega_s$. A corresponding low-pass digital filter, operating at a sampling frequency of $\omega_s$ has, on the other hand, passbands symmetrically centered about multiples of $\omega_s$. Neither filter is acceptable for the present multiplex system since one (high-pass) passes neither sideband of the signal of FIG. 2 and the other (low-pass) passes both sidebands. Clearly, what is desired is a filter which selectively passes only one spectral sideband of the signal components centered about multiples of the sampling frequency $\omega_s$. One approach is to use a filter operating at a sampling frequency which is a multiple, e.g., three, of the channel sampling frequency. However, such a solution is economically unfeasible since hardware, e.g., apparatus 1-$i$, used throughout the entire system must then function at a multipled rate, for example, three times faster.

Figure 3:
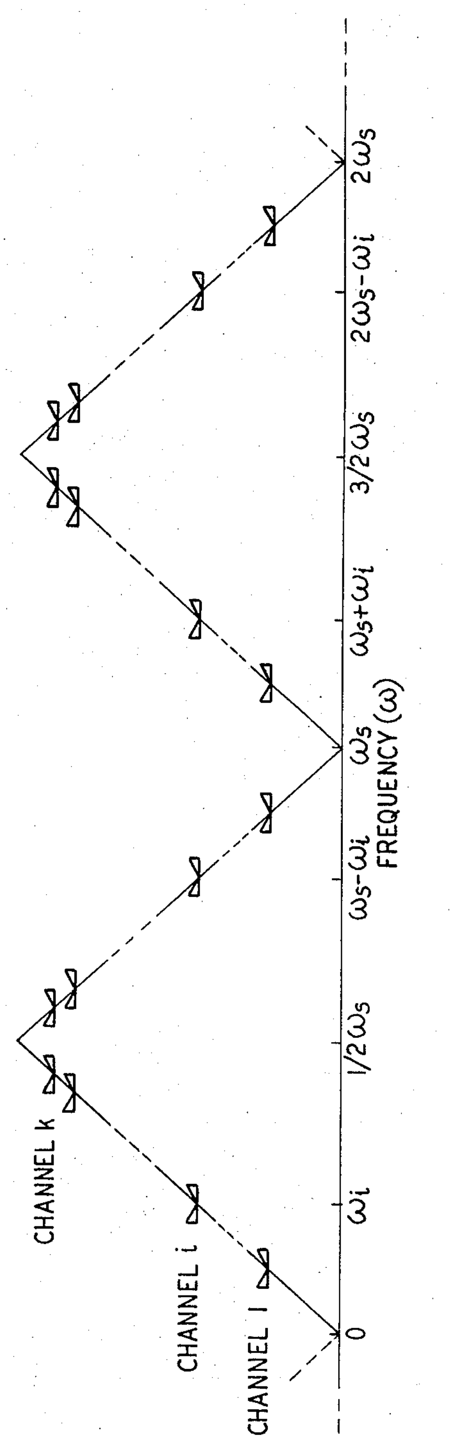

In accordance with this invention, the deleterious effects of a higher multipled sampling rate are avoided by selectively modulating the TDM/DSB signal, appearing at terminal 12, prior to filtering. Thus, commutator 14, synchronized with commutator 11, selectively applies modulating signals sin $\omega_1$t, sin $\omega_2$t, . . . sin $\omega_k$t of sources 14-1, 14-2, . . . 14-*k*, respectively, to modulator 13. Signal sources for the various modulating signals are of any well-known type. Accordingly, when a signal from channel 1 is applied by commutator 11 to modulator 13, via terminal 12, it is modulated at sampling time by the instantaneous value of a sinusoidal signal frequency of $\omega_1$. Similarly, when a signal from the *i*th channel is applied to modulator 13, it is modulated by a sinusoidal signal of frequency $\omega_1$. The modulating signal frequencies may be separated by equal frequency intervals and the maximum frequency, $\omega_k$, must be less than or equal to one-half the sampling frequency $\omega_s$. The modulated signal spectrum is depicted in FIG. 3. The spectra of each channel signal, symmetric about zero frequency and integer multiples of $\omega_s$, correspond to the sum and difference of the baseband signal frequency components and the frequency of the respective modulating signal. In order that the desired sideband of each double-sideband signal may be properly selected, digital filter 15 has a variable passband characteristic. As indicated by coefficient multiplexer 15-1, the coefficients of filter 15 are altered such that the passband of the filter is selectively shifted from one channel to the next in synchronization with commutator 14, and thus with commutator 11. Observed in a different light, filter 15 must appear as *k* different filters, one for each modulated channel signal. Thus, when channel 1 signals are modulated by a signal frequency $\omega_1$, digital filter 15 must pass only one spectral side of the resultant $\omega_1$ modulated double-sideband signals. Similarly, channel *i* signals, modulated by a signal frequency $\omega_i$, must be processed by a filter which passes only the desired $\omega_i$ single sideband signals. Since the passband of a digital filter is readily altered by changing multiplier coefficients, the desired single-sideband signals are easily and economically obtained. Digital filter 15 and its associated coefficient multiplexer 15-1 may be of any known type. The apparatus described in "An Approach to the Implementation of DIgital Filters," L. B. Jackson, J. F. Kaiser, H. S. MacDonald, *IEEE Transactions on Audio and Electroacoustics*, Vol. AU–16, No. Sept. 3, 1968, performs satisfactorily. The resultant digital FDM/SSB channel signals appearing at the output of filter 15 are converted to analog form by digital-to-analog (D/A) converter 16 and low-pass filtered by filter 17 to remove unwanted higher frequency signal components.

Figure 4:
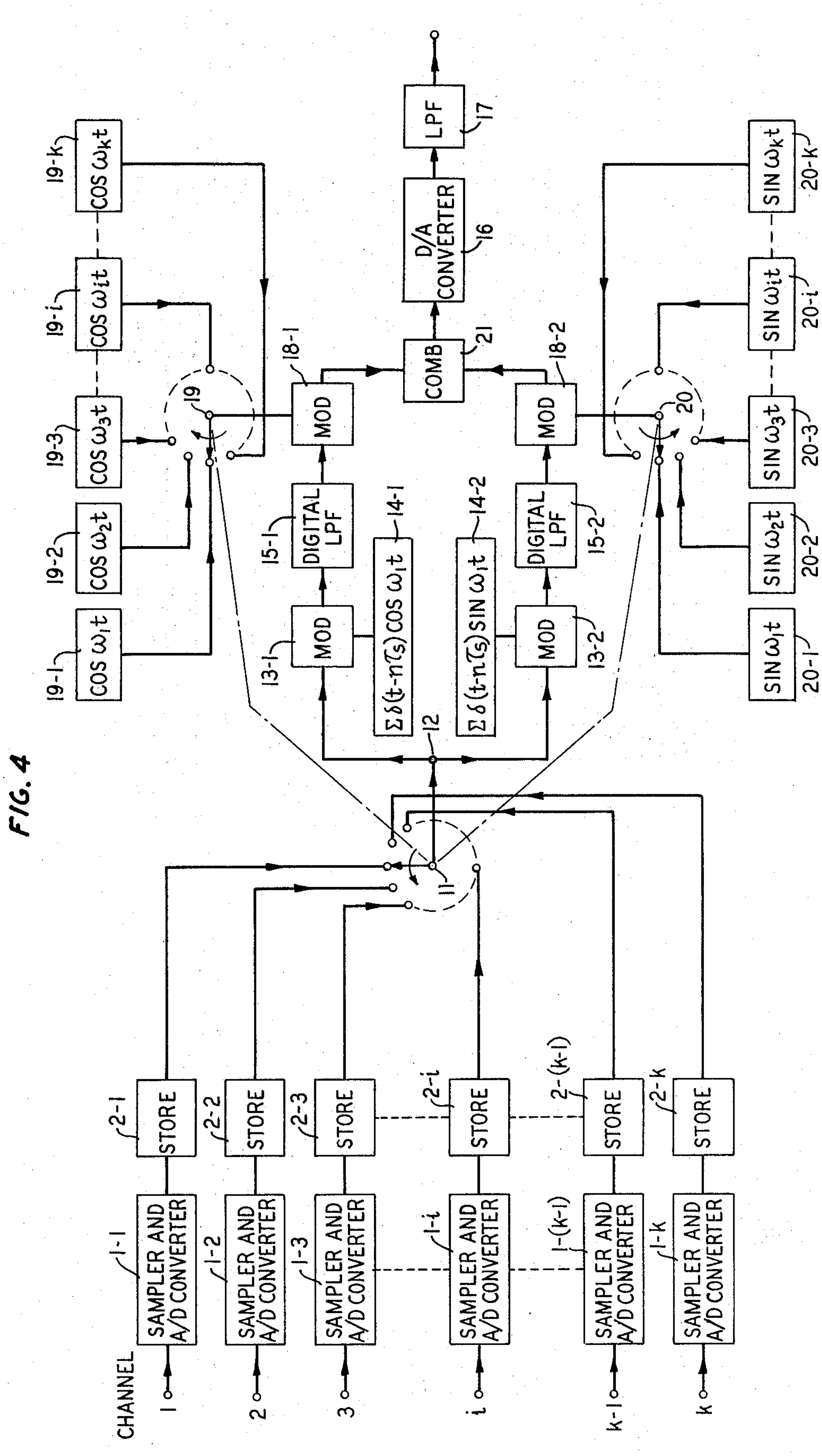
FIG. 4 illustrates a frequency division multiplex single-sideband system which utilizes the principles of this invention.
Figure 5:
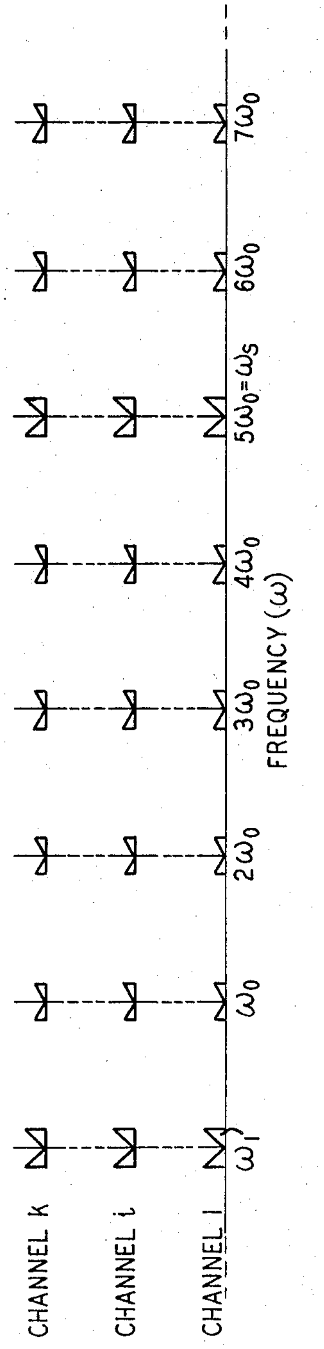
FIG. 5 depicts the various signal spectral components present in the system of FIG. 4.

FIG. 4 illustrates an FDM/SSB system, in accordance with this invention, wherein each channel signal need not be sampled at the same sampling rate as that of the digital filter utilized and wherein selected spectral components are effectively emphasized by signal processing techniques employing repetitive sampling, i.e., commutation. Similar to the system of FIG. 1, a plurality of signal channels, 1 through *k*, are selectively processed to develop an FDM/SSB signal. Each channel signal is sampled and converted to digital form by apparatus 1-1 through 1-*k*, respectively. Although, as mentioned before, the digital filter sampling frequency must be higher than the highest frequency of the FDM/SSB signal, in accordance with this invention, the sampling rate $\omega_o$ of apparatus 1-1 through 1-*k* may be a predetermined fraction $1/m$, *m* an integer, for example 1/5, of the digital filter sampling rate $\omega_s$. Thus, the analog-digital converter apparatus may be operated at a slower rate with a resultant saving in hardware and thus cost. Each coded sampled channel signal is stored in conventional registers 2-1 through 2-*k*, respectively, for the entire channel sampling period $\tau_o = 2\pi/\omega_o$. Commutator 11, or any equivalent thereof, which applies the output signal of storage registers 2-1 through 2-*k* to terminal 12, on the other hand, operates at an angular frequency $\omega_s = m\omega_o$, e.g., $5\omega_o$. Thus, during each interval of time $\tau_o$, commutator 11 samples, i.e., selects, and applies the signals of storage registers 2-1 through 2-*k*, *m* times to terminal 12. Commutator 11, is thus effectively sampling at a rate $\omega_s$. Illustrating each stored channel sample by the respective symbols S-1 through S-*k*, the sequence of signals S1, S2, S3 . . . S*k*, S1 . . . Sk, etc., will be repetitively applied *m* times to terminal 12 in an interval of time $\tau_o$. The samples in registers 2-1 through 2-*k* are then changed and these new samples are repetitively applied to terminal 12, in the manner described, for the next interval of time, $\tau_o$. Stated another way, during the time $\tau_o$, commutator 11 rotates through all channels *m* times, thereby time division multiplexing all *k* channels and repeating the original *k* samples *m* -1 times, thus speeding up the sampling rate by a factor *m*. By this practice, a shaping of the frequency spectra of each channel is advantageously achieved, particularly emphasizing sidebands around zero frequency and integer multiples of the frequency $\omega_s$, the filter sampling frequency, as shown in FIG. 5. It may be shown that this emphasis amounts to multiplying the amplitude of each sideband, symmetric to integer multiples of $\omega_s$, by a factor *m*. Thus, as shown in FIG. 5, the magnitudes of sidebands centered at $\omega = 0$ and $\omega = \omega_s$ are illustratively five times the magnitude of the other spectral sidebands.

The signals appearing at terminal 12 are applied via two circuit paths to modulators 13-1 and 13-2. In modulator 13-1, the signals are modulated with the discrete values of a cosine wave, having a frequency $\omega_1$, derived at sampling interval times $n\tau_s = n2\pi/\omega_s$, n an integer. Likewise, the same signals are modulated, in modulator 13-2, with discrete values of a sine wave, having a frequency $\omega_1$, derived at periodic intervals $n\tau_x$. Apparatus 14-1 and 14-2 for generating the modulating waves may be conventional, for example, a sinusoidal signal source having a gated output controlled by the digital filter timing signals, i.e., signals at the sampling rate, $\omega_s$. The modulating frequency $\omega_1$ is selected to be approximately one-half the highest frequency component in the original message or channel baseband signal, as depicted in FIG. 5. Since it is generally conventional to bandlimit each channel signal to 4 khz, $\omega_1$ may be approximately equal to 2 khz. In accordance with well-known modulating principles, centered about multiples of the original channel sampling frequency $\omega_o$ are the pairs of sideband signals depicted in FIG. 5, displaced in frequency above and below their position shown in FIG. 5 by an amount equivalent to modulating signal frequency $\omega_1$. These signals are processed by conventional digital low-pass filters (LPF) 15-1 and 15-2 to retain only signal components within $\pm\omega_1$ of integer multiples of the filter sampling frequency $\omega_s$. After filtering, the signals of each path are sequentially modulated in modulators 18-1 and 18-2, with the instantaneous values at sampling times $n\tau_s$, of cosine or sine waves, respectively, of staggered frequencies $\omega_1$ to $\omega_k$ to place each channel signal in its proper frequency slot. These frequencies may correspond to the identically identified frequencies of FIG. 1. This modulating process is illustrated by commutators 19 and 20 synchronized with commutator 11, which selectively apply the signal frequencies of sources 19-1, 19-2, . . . 19-*i* . . . 19-*k*, and 20-1, 20-2 . . . 20-*i* . . . 20-*k*, respectively, to modulators 18-1 and 18-2. Sources 19-1, 20-1, etc. may be similar to sources 14-1 and 14-2. Unwanted overlapping sidebands are cancelled by addition or subtraction in conventional arithmetic combining network 21. After conversion to analog form by digital-to-analog (D/A) converter 16 and low-pass filtering by filter 17, the desired staggered frequency spectrum for all *k* channels, i.e., the frequency division multiplex single-sideband signal, is obtained.

Figure 6:
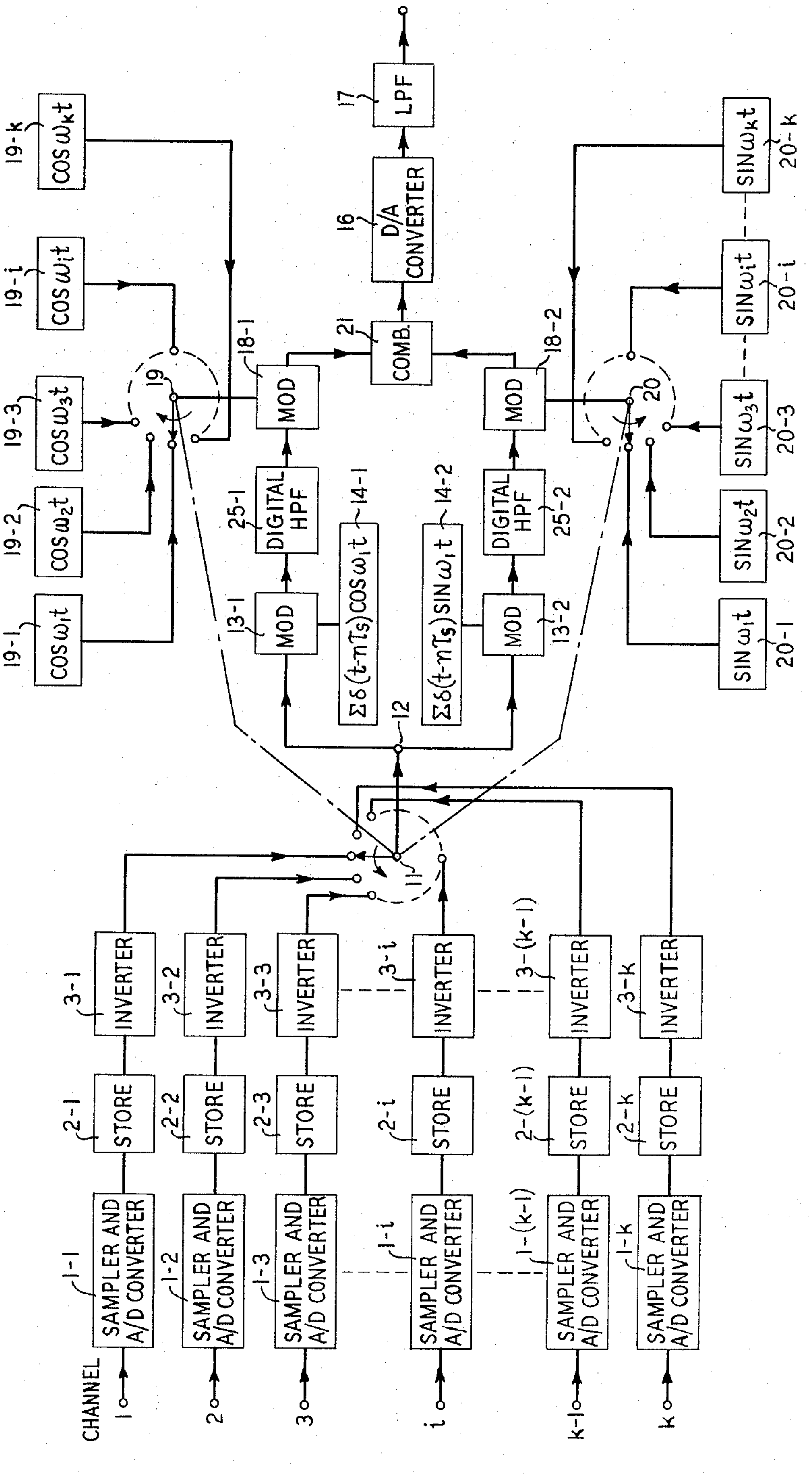
FIG. 6 is a block diagram of a frequency division multiplex single-sideband system of this invention.

Apparatus closely related to that of FIG. 4, using, however, digital high-pass filters (HPF) is shown in FIG. 6. Components identical to those of FIG. 4 are identically numbered. It should be noted that the signal of each storage register 2-1 through 2-*k* is alternately inverted by apparatus 3-1 through 3-*k*, respectively, prior to application to commutator 11. In all other respects, with the exception of the *high-pass* digital filters, 25-1 and 25-2, the operation of the system of FIG. 6 is similar to that of FIG. 4. By alternate inversion is meant that each successive stored sample of each register, 2-1, for example, is multiplied by +1, −1, +1 . . . etc., i.e., by a factor $(-1)^n$, *n* an integer. Thus, after commutation by apparatus 11, it may be shown that a signal spectrum is developed which has sidebands symmetric only to $(V+\frac{1}{2})\omega_o$, $V=\pm1, \pm2, \pm3, \ldots$, i.e., symmetric only to odd multiples of one-half the channel sampling frequency $\omega_o$. The insertion of *m*-1, repetitive samples of the same magnitude, as in the case of the apparatus of FIG. 4, leads likewise to the shaping of the frequency spectrum. Here, however, spectral sidebands are emphasized about the frequencies $(V+\frac{1}{2})\omega_s$, i.e., odd multiples of one-half the filter sampling frequency $\omega_s$. No baseband energy appears about zero frequency.

As previously discussed, the output signal of commutator 11 is applied to terminal 12 and then split into two paths, wherein it is respectively modulated within modulators 13-1 and 13-2 with the instantaneous values at sampling times, $n\tau_s$, of signals cos $\omega_1 t$ and sin $\omega_2 t$. Thereafter, the signals are filtered by conventional high-pass digital filters 25-1 and 25-2 which have passbands of $2\omega_1$ centered about odd multiples of $\frac{1}{2}\omega_s$. The filtered signals are sequentially modulated, in apparatus 18-1 and 18-2, with the instantaneous value of a cosine or sine wave of frequency $\omega_1$ to $\omega_k$, combined by apparatus 21, converted to analog signals by apparatus 16 and, finally, low-pass filtered to develop the desired FDM/SSB signal.

What is claimed is:

1. A modulation system for a plurality of applied analog channel signals comprising:
   - means for sampling and converting each analog channel signal into a digital signal;
   - means for selectively commutating each of said digital signals at a frequency equal to the frequency of said sampling;
   - means for selectively modulating each commutated signal with one of a plurality of sampled sinusoidal signals of diverse frequencies, the maximum sinusoidal signal frequency being no greater than one-half said frequency of sampling;
   - digital filter means, having a variable signal passband characteristic, for selectively processing said modulated signals;
   - means for varying said digital filter means signal passband characteristic in synchronization with said modulating means to select predetermined spectral components of said modulated signals;
   - and means for converting each of said processed signals into a corresponding analog signal to develop a plurality of a frequency division multiplex single-sideband signals.

2. A frequency division multiplex single-sideband modulation system for a plurality of applied analog channel signals comprising:
   - means for converting each analog channel signal into a corresponding digital coded signal;
   - means for selectively sampling each of said digital coded signals at a predetermined rate;
   - means for selectively modulating each sampled digital coded signal with one of a plurality of sampled sinusoidal signals of predetermined frequencies;
   - digital filter means, having a variable signal passband characteristic, for processing said modulated signals;
   - means for varying said digital filter means signal passband characteristic in synchronization with said modulating means;
   - and means for converting each of said processed signals into an analog signal to develop a plurality of a frequency division multiplex single-sideband signals.

3. Apparatus for frequency division multiplexing a plurality of applied analog channel signals comprising:
   - means for converting each analog channel signal into a corresponding digital channel signal;
   - means for multiplexing said digital channel signals to develop a plurality of channel signals separated by predetermined intervals of time;
   - means for selectively modulating each multiplexed channel signal with a sinusoidal signal;
   - digital filter means, having a variable signal passband characteristic, for processing said modulated signals;
   - means for varying said digital filter means signal passband characteristic such that the passband of the filter is selectively shifted from one modulated channel signal to the next in synchronization with said modulating means;
   - and means for converting each of said processed signals into a corresponding analog signal to develop a plurality of a frequency division multiplex single-sideband channel signals.

4. Apparatus for converting a plurality of space division channel signals into a plurality of frequency division multiplex signals comprising:
   - modulator means;
   - first means for successively applying each of said channel signals to the input terminal of said modulator means;
   - a plurality of sinusoidal signal sources having diverse signal frequencies, each signal frequency associated with one of said plurality of channel signals;
   - second means, in synchronization with said first means, for successively applying said sinusoidal signal frequencies to said modulator means;
   - digital filter means having a selectively alterable passband for processing the signal output of said modulator means;
   - and third means, in synchronization with said second means, for selectively altering the passband of said digital filter means to successively pass predetermined spectral components of the signal output of said modulator means.

5. A single-sideband frequency division multiplex system comprising:
   - a plurality of input signal channels, each including means for converting applied analog signals into digital signals and means for storing said digital signals for a first predetermined interval of time;
   - means for selectively applying said stored digital signals to a terminal in an interval of time which is a predetermined fraction of said first predetermined interval of time;
   - first and second circuit paths connected to said terminal, each circuit path including first means for modulating said selectively applied signals with a sampled sinusoidal signal of predetermined frequency, digital filter means for processing said modulated signals, and second means for modulating said processed signals with a plurality of sampled sinusoidal signals of diverse frequencies;
   - means for arithmetically combining the output signals of said first and second circuit paths;
   - means for converting said combined signals to analog output signals;
   - and means for filtering said analog output signals.

6. The multiplex system as defined in claim 5 wherein said digital filter means has a low-pass signal characteristic.

7. The multiplex system as defined in claim 5 wherein said digital filter means has a high-pass signal characteristic.

8. A single-sideband frequency division multiplex system comprising:
   - a plurality of input signal channels, each including means for sampling applied signals and means for storing said sampled signals for a first predetermined interval of time equal to the reciprocal of the sampling rate;
   - first means for successively applying to a terminal said stored channel signals in an interval of time which is a predetermined fraction of said first predetermined interval of time;
   - first and second circuit paths connected to said terminal, each circuit path including first means for modulating said successively applied signals with a signal of predetermined frequency, filter means for processing said modulated signals, and second means for modulating said processed signals with a plurality of signals of diverse frequencies;
   - and means for arithmetically combining the output signals of said first and second circuit paths.

9. A single-sideband frequency division multiplex system comprising:

means for storing a plurality of applied digital signals for a first predetermined interval of time;

means for selectively applying to a terminal said stored digital signals for a second predetermined interval of time;

first and second circuit paths connected to said terminal, each circuit path including first means for modulating said repetitively applied signals with a sampled sinusoidal signal of predetermined frequency, digital filter means for processing said modulated signals, and second means for modulating said processed signals with a plurality of sampled sinusoidal signals of diverse frequencies;

and means for arithmetically combining the output signals of said first and second circuit paths.

10. The multiplex system as defined in claim 9 wherein said digital filter means has a low-pass signal characteristic.

11. The multiplex system as defined in claim 9 wherein said digital filter means has a high-pass signal characteristic.

12. A single-sideband frequency division multiplex system comprising:

a plurality of input signal channels, each including means for sampling and converting applied analog signals into digital signals and means for storing said digital signals for a first predetermined interval of time equal to the reciprocal of the channel sampling rate;

means for selectively applying said stored digital signals to a terminal at a rate which is a predetermined multiple of said sampling rate;

first and second circuit paths connected to said terminal, each circuit path including first means for modulating said selectively applied signals with a sampled sinusoidal signal of predetermined frequency, digital filter means for processing said modulated signals, and second means for modulating each of said processed signals with one of a plurality of sampled sinusoidal signals of diverse frequencies;

means for arithmetically combining the output signals of said first and second circuit paths;

and means for converting said combined signals to analog output signals.

13. The multiplex system as defined in claim 12 wherein said digital filter means has a low-pass signal characteristic.

14. The multiplex system as defined in claim 12 wherein said digital filter means has a high-pass signal characteristic.

15. A single-sideband frequency division multiplex system comprising:

means for converting a plurality of applied analog signals into digital signals;

means for storing said converted signals for a first predetermined interval of time;

means for commutating said stored converted signals at a rate which is a predetermined multiple of the reciprocal of said first predetermined interval of time;

first and second circuit paths responsive to said commutated signals, each circuit path including first means for modulating said commutated signals with a sampled sinusoidal signal of predetermined frequency, digital filter means for processing said modulated signals, and second means for modulating said processed signals with a plurality of sampled sinusoidal signals of diverse frequencies;

means for arithmetically combining the output signals of said first and second circuit paths;

and means for converting said combined signals to analog output signals to develop a plurality of frequency division multiplex single-sideband signals.

16. A single-sideband frequency division multiplex system comprising:

means for storing a plurality of applied digital signals for a first predetermined interval of time;

means for alternately inverting the sign of each of said stored signals;

means for repetitively applying to a terminal said inverted stored signals for a second predetermined interval of time;

first and second circuit paths connected to said terminal, each circuit path including first means for modulating said repetitively applied signals with a sampled sinusoidal signal of predetermined frequency, digital filter means for processing said modulated signals, and second means for modulating said processed signals with a plurality of sampled sinusoidal signals of diverse frequencies;

and means for arithmetically combining the output signals of said first and second circuit paths.

17. a single-sideband frequency division multiplex system comprising:

a plurality of input signal channels, each including means for storing applied signals for a first predetermined interval of time;

means for selectively commutating said stored signals at a rate which is a predetermined multiple of the reciprocal of said first predetermined interval of time;

first means for selectively modulating each of said commutated signals with a sampled sinusoidal signal of predetermined frequency;

digital filter means for processing said modulated signals;

second means for selectively modulating said processed signals with a plurality of sampled sinusoidal signals of diverse frequencies;

and third means for selectively combining the modulated signals of said second means.

18. The multiplex system as defined in claim 17 wherein said digital filter means has a low-pass signal characteristic.

19. The multiplex system as defined in claim 17 wherein said digital filter means has a high-pass signal characteristic.

* * * * *